(12) United States Patent
Emura et al.

(10) Patent No.: US 10,316,951 B2
(45) Date of Patent: Jun. 11, 2019

(54) BICYCLE DRIVE UNIT

(71) Applicant: SHIMANO INC., Sakai (JP)

(72) Inventors: Atsuhiro Emura, Sakai (JP); Toshinari Oishi, Sakai (JP); Yusuke Nishimoto, Sakai (JP); Sota Yamaguchi, Sakai (JP); Kohei Obuchi, Sakai (JP); Kento Mitsuyasu, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/209,686

(22) Filed: Jul. 13, 2016

(65) Prior Publication Data

US 2018/0017152 A1    Jan. 18, 2018

(51) Int. Cl.
| | | |
|---|---|---|
| *B62M 6/55* | (2010.01) | |
| *F16H 57/025* | (2012.01) | |
| *B62K 25/28* | (2006.01) | |
| *B62K 25/30* | (2006.01) | |
| *B62M 1/36* | (2013.01) | |

(52) U.S. Cl.
CPC ......... *F16H 57/025* (2013.01); *B62K 25/286* (2013.01); *B62K 25/30* (2013.01); *B62M 1/36* (2013.01); *B62M 6/55* (2013.01)

(58) Field of Classification Search
CPC .......... F16H 57/025; B62M 1/36; B62M 1/28
See application file for complete search history.

(56) References Cited

U.S. PATENT DOCUMENTS

| | | | |
|---|---|---|---|
| 5,873,590 A * | 2/1999 | Abe | B62J 13/04 |
| | | | 280/259 |
| 6,979,014 B2 | 12/2005 | Morita | |
| 7,097,190 B2 | 8/2006 | Matsumoto et al. | |
| 7,153,229 B2 | 12/2006 | Matsumoto et al. | |
| 7,326,137 B2 | 2/2008 | van der Linde | |
| 7,367,575 B2 | 5/2008 | Matsumoto et al. | |
| 7,381,143 B2 | 6/2008 | Matsumoto et al. | |
| 7,503,862 B2 | 3/2009 | Kaga et al. | |
| 7,520,831 B2 | 4/2009 | Kaga et al. | |
| 7,611,430 B2 * | 11/2009 | Matsumoto | B62M 9/00 |
| | | | 474/80 |
| 7,621,834 B2 | 11/2009 | Kaga et al. | |
| 7,686,716 B2 | 3/2010 | Matsumoto et al. | |
| 7,736,253 B2 * | 6/2010 | Matsumoto | B62M 9/14 |
| | | | 474/69 |
| 7,744,498 B2 | 6/2010 | Matsumoto et al. | |
| 7,988,574 B2 | 8/2011 | Matsumoto et al. | |
| 8,186,244 B2 | 5/2012 | Matsumoto et al. | |
| 8,944,945 B2 | 2/2015 | Kilshaw | |

(Continued)

*Primary Examiner* — Vicky A Johnson
(74) *Attorney, Agent, or Firm* — Mori & Ward, LLP

(57) ABSTRACT

A bicycle drive unit comprises a housing configured to be mounted to a first base member. The housing includes a first wall at least partly defining an internal space to at least partly accommodate a bicycle crank having a crank rotational axis. The first wall includes a first transmitting surface disposed to at least partly face upward in a bicycle upright state where the crank rotational axis horizontally extends and the housing is mounted on the first base member. The first transmitting surface is configured to face a first receiving surface of the first base member to transmit an upward force from the housing to the first base member. The first transmitting surface being at least partly disposed below the crank rotational axis in the bicycle upright state.

24 Claims, 9 Drawing Sheets

(56) References Cited

U.S. PATENT DOCUMENTS

| | | | |
|---|---|---|---|
| 2005/0215367 A1* | 9/2005 | Thomasberg | B62M 9/14 474/78 |
| 2006/0046881 A1* | 3/2006 | Matsumoto | B62M 9/14 474/81 |
| 2006/0240919 A1 | 10/2006 | Matsumoto et al. | |
| 2007/0155567 A1* | 7/2007 | Miller | B62M 9/08 475/37 |
| 2008/0261735 A1 | 10/2008 | Cappellini | |
| 2015/0101874 A1* | 4/2015 | Getta | B62M 6/55 180/206.4 |

* cited by examiner

BICYCLE DRIVE UNIT

BACKGROUND OF THE INVENTION

Field of the Invention

The present invention relates to a bicycle drive unit.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a drive unit.

SUMMARY OF THE INVENTION

In accordance with a first aspect of the present invention, a bicycle drive unit comprises a housing configured to be mounted to a first base member. The housing includes a first wall at least partly defining an internal space to at least partly accommodate a bicycle crank having a crank rotational axis. The first wall includes a first transmitting surface disposed to at least partly face upward in a bicycle upright state where the crank rotational axis horizontally extends and the housing is mounted on the first base member. The first transmitting surface is configured to face a first receiving surface of the first base member to transmit an upward force from the housing to the first base member. The first transmitting surface being at least partly disposed below the crank rotational axis in the bicycle upright state.

With the bicycle drive unit according to the first aspect, since the first transmitting surface being at least partly disposed below the crank rotational axis in the bicycle upright state, it is possible to utilize a space provided below the crank rotational axis for the housing. Furthermore, even when the space is utilized for the housing, the first receiving surface of the first base member receives the upward force from the first transmitting surface of the housing when the upward force is applied to the housing of the bicycle drive unit (e.g., when the housing hits against an obstacle on a road). Accordingly, it is possible to improve strength of the bicycle drive unit with maintaining a desired size of the bicycle drive unit.

In accordance with a second aspect of the present invention, the bicycle drive unit according to the first aspect is configured so that the first transmitting surface is configured to contact the first receiving surface.

With the bicycle drive unit according to the second aspect, the first receiving surface directly receives the upward force from the first transmitting surface. Thus, it is possible to improve the transmission efficiency of the upward force between the housing and the first base member.

In accordance with a third aspect of the present invention, the bicycle drive unit according to any one of the above aspects further comprises a first intermediate member provided between the first receiving surface and the first transmitting surface. The first transmitting surface faces the first receiving surface to transmit the upward force from the housing to the first base member via the first intermediate member in the bicycle upright state.

With the bicycle drive unit according to the third aspect, the first receiving surface indirectly receives the upward force from the first transmitting surface via the first intermediate member. Thus, it is possible to reduce wear of at least one of the first transmitting surface and the first receiving surface. Furthermore, it is possible to reduce impact transmitted from the housing to the first base member by using the first intermediate member in a case where the first intermediate member is made of a material suitable for reducing the impact.

In accordance with a fourth aspect of the present invention, the bicycle drive unit according to any one of the above aspects is configured so that the housing is made of a resin material.

With the bicycle drive unit according to the fourth aspect, it is possible to save weight of the housing.

In accordance with a fifth aspect of the present invention, the bicycle drive unit according to any one of the above aspects is configured so that the first wall includes a first side surface disposed to face the first base member in an axial direction parallel to the crank rotational axis.

With the bicycle drive unit according to the fifth aspect, it is possible to stabilize an orientation of the housing relative to the first base member with the first side surface.

In accordance with a sixth aspect of the present invention, the bicycle drive unit according to any one of the above aspects is configured so that the first transmitting surface is continuously coupled to the first side surface.

With the bicycle drive unit according to the sixth aspect, it is possible to effectively utilize at least part of an outer surface of the housing as the first transmitting surface and the first side surface. Thus, it is possible to maintain a larger area for the first transmitting surface and the first side surface.

In accordance with a seventh aspect of the present invention, the bicycle drive unit according to any one of the above aspects is configured so that the first wall is configured to be secured to the first base member with a fastener.

With the bicycle drive unit according to the seventh aspect, it is possible to improve coupling strength between the housing and the first base member. Thus, it is possible to effectively receive the upward force with the first receiving surface of the first base member.

In accordance with an eighth aspect of the present invention, the bicycle drive unit according to any one of the above aspects is configured so that the first wall includes a first opening aligned with the crank rotational axis.

With the bicycle drive unit according to the eighth aspect, it is possible to arrange the bicycle crank to extend through the first opening with maintaining a desired strength of the housing.

In accordance with a ninth aspect of the present invention, the bicycle drive unit according to any one of the above aspects is configured so that the first opening includes a first center axis coinciding with the crank rotational axis.

With the bicycle drive unit according to the ninth aspect, it is possible to reduce an unnecessary area of the first opening. Thus, it is possible to maintain a desired strength of the housing.

In accordance with a tenth aspect of the present invention, the bicycle drive unit according to any one of the above aspects is configured so that the first transmitting surface includes a first linear surface extending linearly in a perpendicular direction perpendicular to the crank rotational axis.

With the bicycle drive unit according to the tenth aspect, it is possible to determine a transmitting direction of the upward force transmitted from the first transmitting surface to the first receiving surface based on a facing direction in which the first linear surface faces. Thus, it is possible to design a shape of the first base member based on the transmitting direction.

In accordance with an eleventh aspect of the present invention, the bicycle drive unit according to any one of the above aspects is configured so that the first transmitting surface includes a first curved surface extending in a circumferential direction defined about the crank rotational axis.

With the bicycle drive unit according to the eleventh aspect, it is possible to enlarge the first transmitting surface without interference between the first transmitting surface and the bicycle crank. Thus, it is possible to enlarge the first transmitting surface, improving the strength of the bicycle drive unit.

In accordance with a twelfth aspect of the present invention, the bicycle drive unit according to any one of the above aspects is configured so that the first transmitting surface includes a first linear surface extending linearly in a perpendicular direction perpendicular to the crank rotational axis. The first curved surface extends from an end of the first linear surface in the circumferential direction.

With the bicycle drive unit according to the twelfth aspect, it is possible to enlarge the first transmitting surface with the first linear surface and the first curved surface, effectively improving strength of the bicycle drive unit.

In accordance with a thirteenth aspect of the present invention, the bicycle drive unit according to any one of the above aspects is configured so that the first transmitting surface includes a first longitudinal end, a first opposite longitudinal end opposite to the first longitudinal end, and a first intermediate portion provided between the first longitudinal end and the first opposite longitudinal end. The first intermediate portion is disposed below the crank rotational axis in the bicycle upright state.

With the bicycle drive unit according to the thirteenth aspect, it is possible to effectively utilize the space dispose below the crank rotational axis for the first intermediate portion of the first transmitting surface. Accordingly, it is possible to improve the strength of the bicycle drive unit with maintaining a desired size of the first transmitting surface.

In accordance with a fourteenth aspect of the present invention, the bicycle drive unit according to any one of the above aspects is configured so that the first longitudinal end is disposed above the crank rotational axis in the bicycle upright state.

With the bicycle drive unit according to the fourteenth aspect, it is possible to utilize a space provided above the crank rotational axis for the first transmitting surface. Thus, it is possible to improve the strength of the bicycle drive unit with maintaining a desired size of the first transmitting surface.

In accordance with a fifteenth aspect of the present invention, the bicycle drive unit according to any one of the above aspects is configured so that the first longitudinal end is closer to the crank rotational axis than the first opposite longitudinal end.

With the bicycle drive unit according to the fifteenth aspect, it is possible to utilize a space provided around the crank rotational axis for the first transmitting surface. Thus, it is possible to improve the strength of the bicycle drive unit with maintaining a desired size of the first transmitting surface.

In accordance with a sixteenth aspect of the present invention, the bicycle drive unit according to any one of the above aspects is configured so that the housing includes a second wall spaced apart from the first wall in the axial direction to at least partly define the internal space between the first wall and the second wall.

With the bicycle drive unit according to the sixteenth aspect, it is possible to stabilize an orientation of the housing relative to the first base member.

In accordance with a seventeenth aspect of the present invention, the bicycle drive unit according to any one of the above aspects is configured so that the second wall includes a second transmitting surface disposed to at least partly face upward in the bicycle upright state and configured to face a second receiving surface of the first base member to transmit the upward force from the housing to the first base member. The second transmitting surface is at least partly disposed below the crank rotational axis in the bicycle upright state.

With the bicycle drive unit according to the seventeenth aspect, the second receiving surface of the first base member receives the upward force from the second transmitting surface of the housing when the upward force is applied to the housing of the bicycle drive unit (e.g., when the housing hits against an obstacle on a road). Accordingly, it is possible to improve strength of the bicycle drive unit with maintaining a desired size of the bicycle drive unit.

In accordance with an eighteenth aspect of the present invention, the bicycle drive unit according to any one of the above aspects is configured so that the first base member includes a first mounting part and a second mounting part spaced apart from the first mounting part in an axial direction parallel to the crank rotational axis. The housing is provided between the first mounting part and the second mounting part in the axial direction.

With the bicycle drive unit according to the eighteenth aspect, it is possible to stabilize an orientation of the housing relative to the first base member.

In accordance with a nineteenth aspect of the present invention, the bicycle drive unit according to any one of the above aspects is configured so that the first mounting part includes the first receiving surface. The second mounting part includes the second receiving surface.

With the bicycle drive unit according to the nineteenth aspect, it is possible to receive the upward force with the first mounting part and the second mounting part. Thus, it is possible to improve the strength of the bicycle drive unit with stabilizing the orientation of the housing relative to the first base member.

In accordance with a twentieth aspect of the present invention, the bicycle drive unit according to any one of the above aspects is configured so that the housing includes a bottom part coupled to the first wall to at least partly define the internal space.

With the bicycle drive unit according to the twentieth aspect, it is possible to protect a component provided in the internal space from the obstacle with the bottom part.

In accordance with a twenty-first aspect of the present invention, the bicycle drive unit according to any one of the above aspects is configured so that the bottom part is disposed below the first transmitting surface in the bicycle upright state.

With the bicycle drive unit according to the twenty-first aspect, it is possible to easily receive the upward force from the obstacle with the bottom part. Thus, it is possible to transmit the upward force from the bottom part to the first transmitting surface.

In accordance with a twenty-second aspect of the present invention, the bicycle drive unit according to any one of the above aspects is configured so that the bottom part includes a bottom wall, and a reinforcing portion coupled to the bottom wall to reinforce the bottom wall.

With the bicycle drive unit according to the twenty-second aspect, it is possible to improve strength of the bottom part of the housing even if the bottom part hits against the obstacle on the road.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
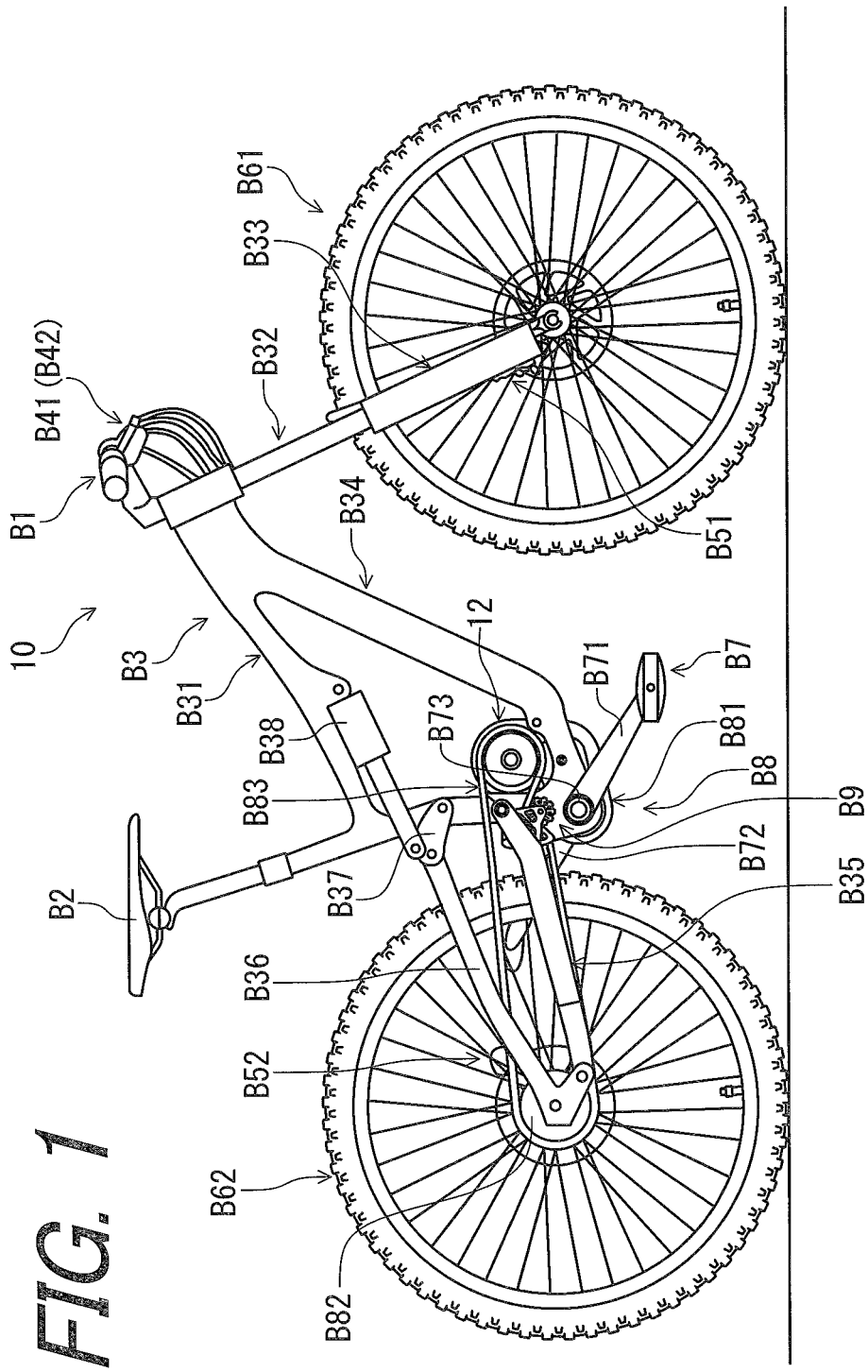
FIG. 1 is a side elevational view of a bicycle provided with a bicycle drive unit in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle drive unit 12 in accordance with a first embodiment. While the bicycle 10 is illustrated as a mountain bike, the bicycle drive unit 12 can be applied to road bikes or any type of bicycle.

As seen in FIG. 1, the bicycle 10 includes a handlebar B1, a saddle B2, a bicycle body B3, a left operating device B41, a right operating device B42, a front braking device B51, a rear braking device B52, a front wheel B61, a rear wheel B62, a bicycle crank B7, and a drive train B8. The left operating device B41 is operatively coupled to one of the front braking device B51 and the rear braking device B52 via a control cable. The right operating device B42 is operatively coupled to the other of the front braking device B51 and the rear braking device B52 via a control cable. The bicycle body B3 includes a bicycle frame B31 and a front fork B32 pivotally coupled to the bicycle frame B31. The front fork B32 includes a suspension B33. The drive train B8 includes the bicycle drive unit 12, a rear sprocket B82, and a driving-force transmitting member B83. The bicycle drive unit 12 is coupled to the rear sprocket B82 via the driving-force transmitting member B83. The bicycle crank B7 includes crank arms B71 and B72. The bicycle crank B7 is coupled to the bicycle drive unit 12 to transmit a pedaling force to the bicycle drive unit 12. The bicycle crank B7 includes a crank axle B73. The crank arms B71 and B72 are respectively secured to both ends of the crank axle B73.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B2 of the bicycle 10 with facing the handlebar B1. Accordingly, these terms, as utilized to describe the bicycle drive unit 12, should be interpreted relative to the bicycle 10 equipped with the bicycle drive unit 12 as used in an upright riding position on a horizontal surface.

As seen in FIG. 1, the bicycle frame B31 includes a first base member B34, a second base member B35, a third base member B36, and a fourth base member B37. The front fork B32 is pivotally coupled to the first base member B34. The second base member B35 is movably coupled to the first base member B34. The second base member B35 is movably coupled to the third base member B36. The third base member B36 is movably coupled to the fourth base member B37. The fourth base member B37 is movably coupled to the first base member B34. The bicycle 10 includes a tensioner B9 to apply tension to the driving-force transmitting member B83.

In this embodiment, the second base member B35 is pivotally coupled to the first base member B34. The second base member B35 is pivotally coupled to the third base member B36. The third base member B36 is pivotally coupled to the fourth base member B37. The fourth base member B37 is pivotally coupled to the first base member B34. The rear wheel B62 is rotatably mounted to the third base member B36. The bicycle body B3 includes a damper B38 coupling the first base member B34 to the fourth base member B37. Alternatively, the second base member B35, the third base member B36, and the fourth base member B37 are integrally provided with each other as a one-piece unitary member.

Figure 2:
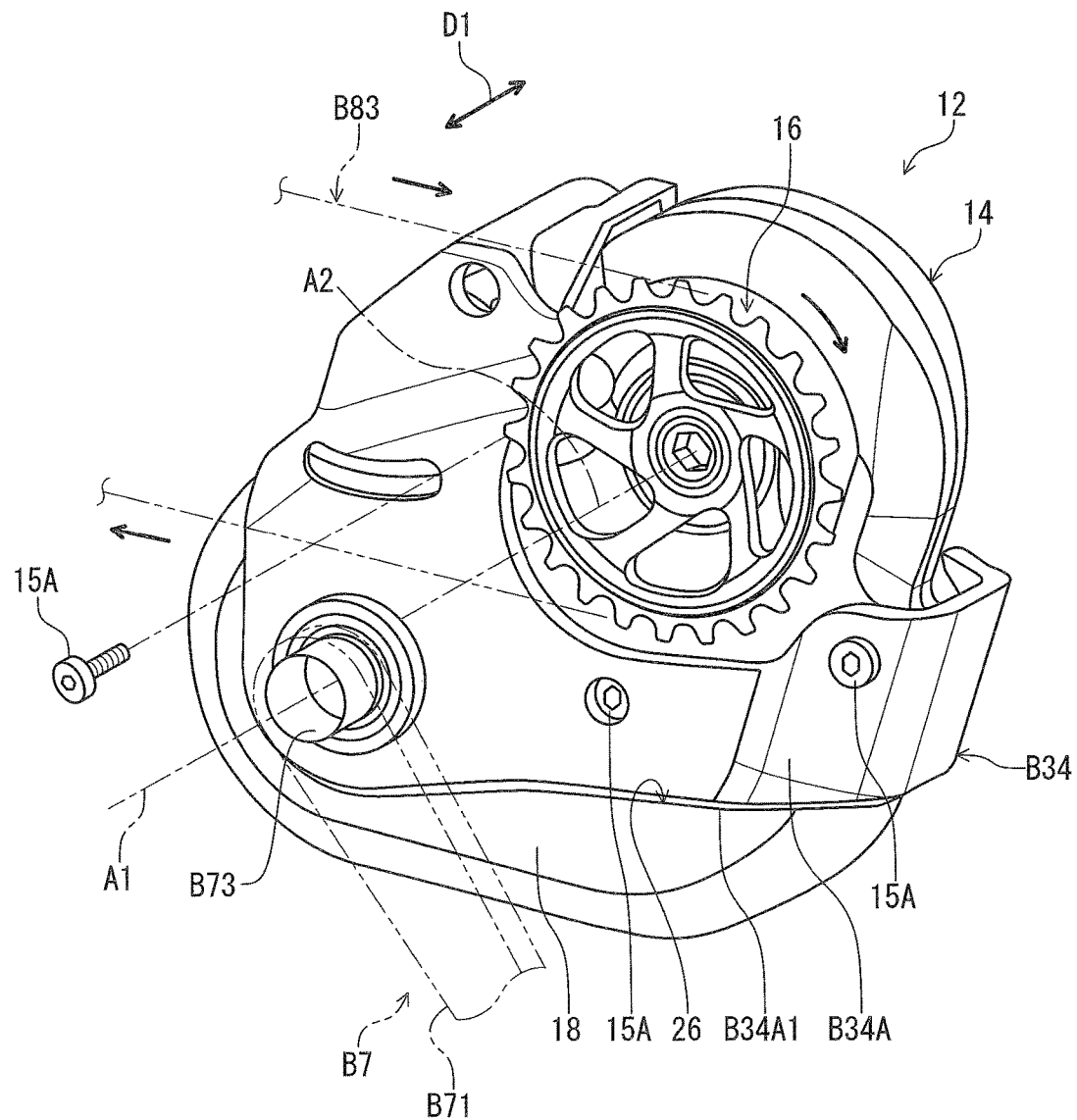
FIG. 2 is a perspective view of the bicycle drive unit illustrated in FIG. 1.

As seen in FIG. 2, the bicycle drive unit 12 comprises a housing 14. The housing 14 is configured to be mounted to the first base member B34. The housing 14 is secured to the first base member B34 with fasteners 15A and 15B such as a screw. The housing 14 can be secured to the first base member B34 with another securing structure such as adhesive. In the illustrated embodiment, the housing 14 is made of a resin material. The first base member is made of a metallic material or a resin material including carbon fiber. However, the housing 14 can be made of a material other than the resin material.

The bicycle drive unit 12 comprises an output member 16 disposed outside the housing 14. The output member 16 is rotatably mounted to the housing 14 about an output rotational axis A2 and is engaged with the driving-force transmitting member B83 to transmit an output rotational force. In this embodiment, the output member 16 includes a cogwheel such as a sprocket or a pulley, and the driving-force transmitting member B83 includes a bicycle chain. However, the output member 16 can include another element. The driving-force transmitting member B83 can include a belt.

The bicycle drive unit 12 comprises a shifting structure (not shown) provided in the housing 14. Such a shifting structure includes a plurality of transmission members (e.g., cogwheels and/or gears) to define the speed stage of the bicycle drive unit 12. The shifting structure varies a current speed stage among the speed stages and transmits a pedaling force from the bicycle crank B7 to the output member 16. The bicycle drive unit 12 can include an assist device (e.g., an assist motor) to apply an assist force to the output member 16 based on an input rotational force input to the bicycle crank B7. Since the shifting structure has been well known in the bicycle field, it will not be described in detail here for the sake of brevity.

Figure 3:
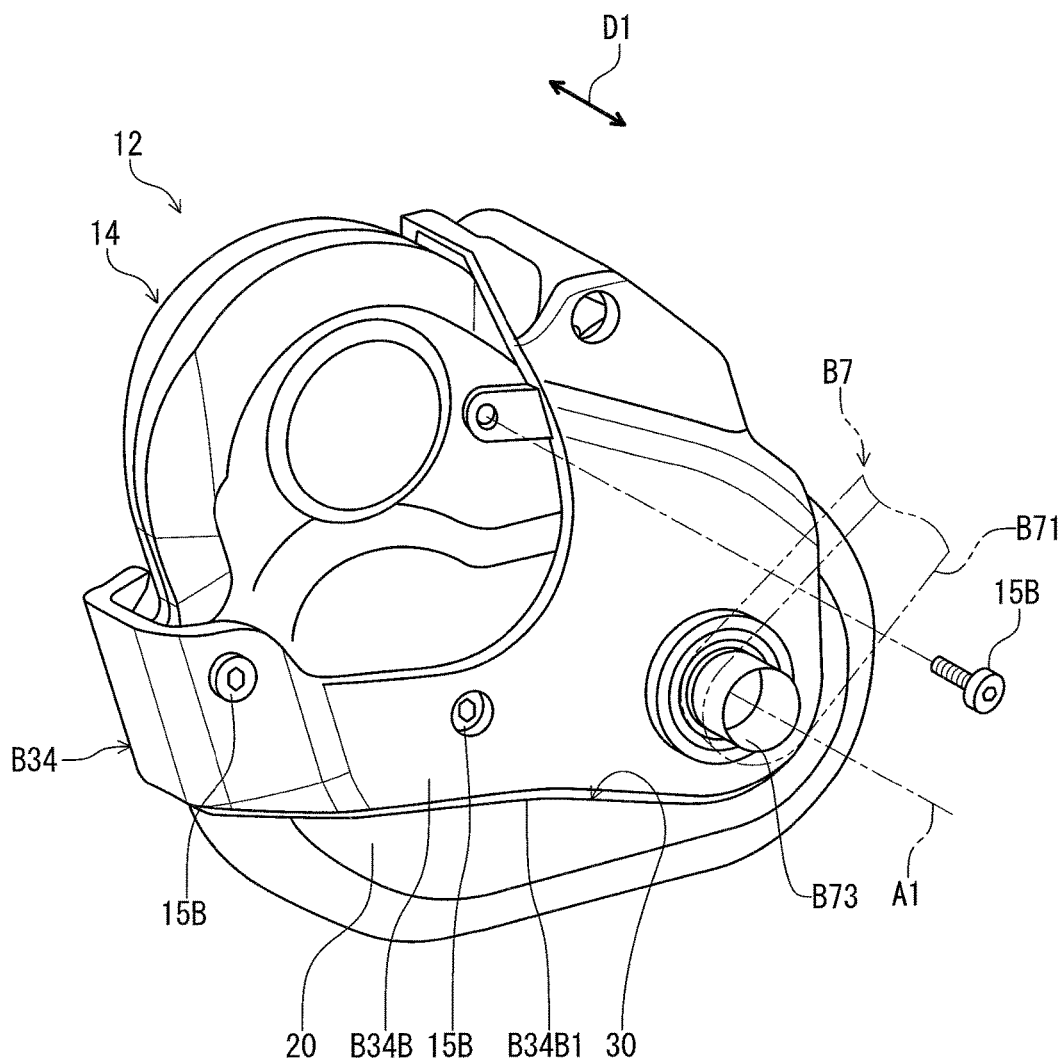
FIG. 3 is another perspective view of the bicycle drive unit illustrated in FIG. 1.

As seen in FIGS. 2 and 3, the first base member B34 includes a first mounting part B34A and a second mounting part B34B spaced apart from the first mounting part B34A in an axial direction D1 parallel to the crank rotational axis A1. The housing 14 is provided between the first mounting part B34A and the second mounting part B34B in the axial direction D1. The housing 14 is secured to the first base member B34 with the fasteners 15A and 15B such as a screw. The housing 14 is secured to the first mounting part B34A with the fasteners 15A. The housing 14 is secured to the second mounting part B34B with the fasteners 15B.

Figure 4:
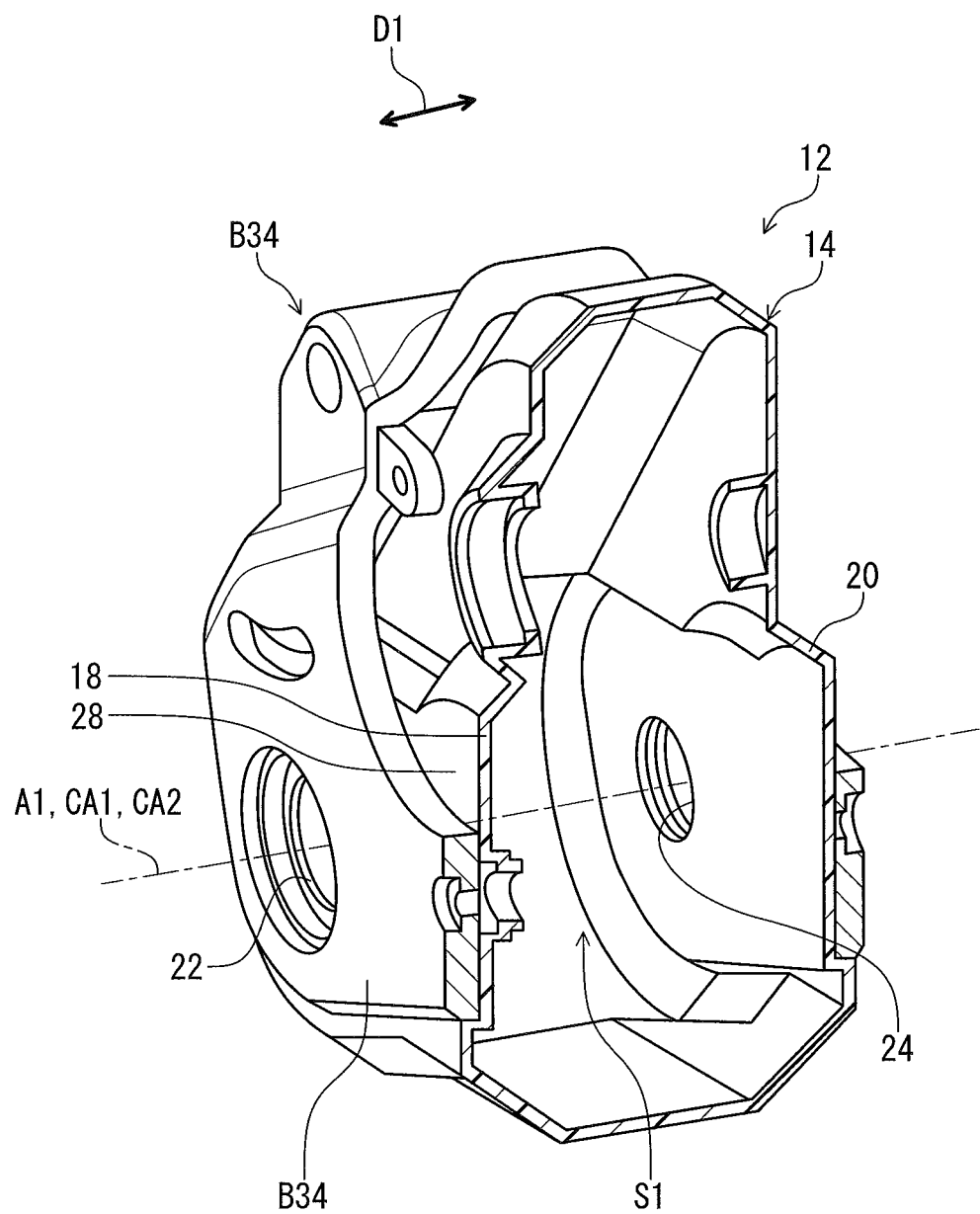
FIG. 4 is a cross-sectional view of a housing and a first base member of the bicycle drive unit illustrated in FIG. 1.

As seen in FIG. 4, the housing 14 includes a first wall 18 at least partly defining an internal space S1 to at least partly accommodate the bicycle crank B7 having the crank rotational axis A1. The housing 14 includes a second wall 20 spaced apart from the first wall 18 in the axial direction D1 to at least partly define the internal space S1 between the first wall 18 and the second wall 20. The bicycle crank B7 is rotatable relative to the first base member B34 of the bicycle body B3 about the crank rotational axis A1.

As seen in FIG. 2, the first wall 18 is configured to be secured to the first base member B34 with the fastener 15A. As seen in FIG. 4, the first wall 18 includes a first opening 22 aligned with the crank rotational axis A1. The first opening 22 includes a first center axis CA1 coinciding with the crank rotational axis A1. However, the first center axis CA1 can offset from the crank rotational axis A1.

As seen in FIG. 3, the second wall 20 is configured to be secured to the first base member B34 with the fastener 15B. As seen in FIG. 4, the second wall 20 includes a second opening 24 aligned with the crank rotational axis A1. The second opening 24 includes a second center axis CA2 coinciding with the crank rotational axis A1. However, the second center axis CA2 can offset from the crank rotational axis A1.

Figure 5:
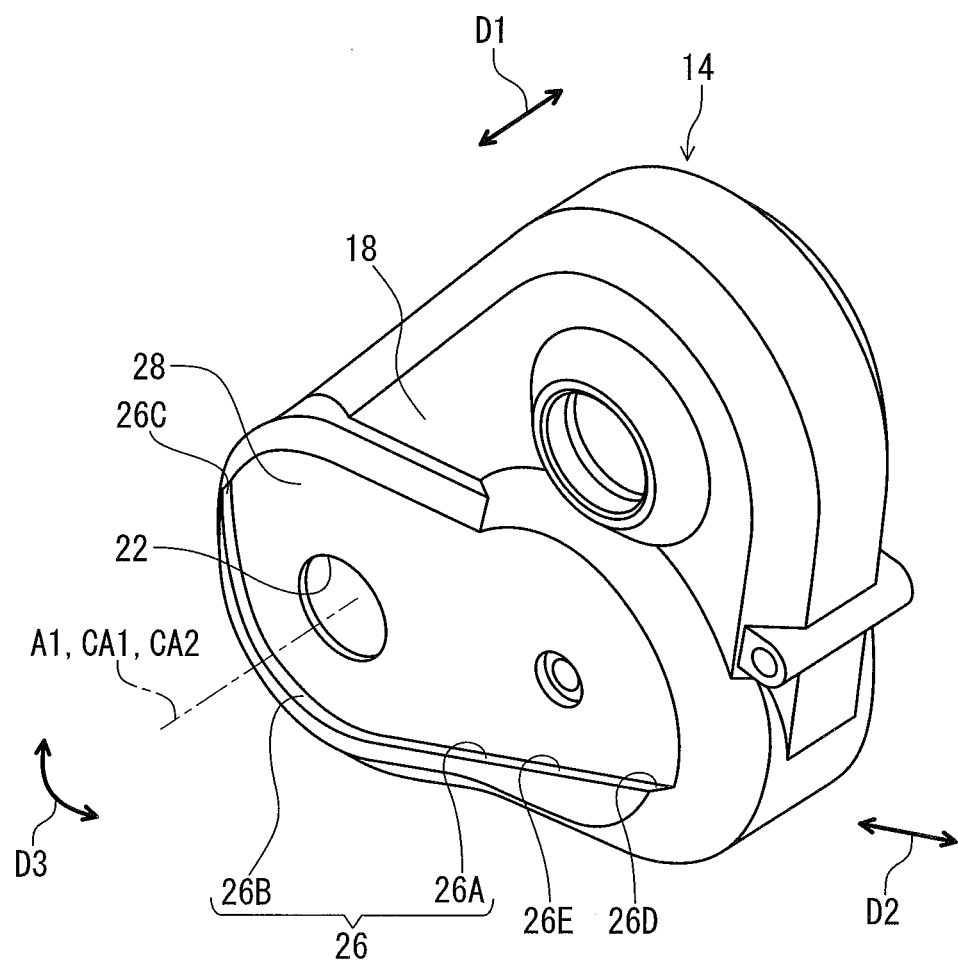
FIG. 5 is a perspective view of the housing of the bicycle drive unit illustrated in FIG. 1.

As seen in FIG. 5, the first wall 18 includes a first transmitting surface 26 disposed to at least partly face upward in a bicycle upright state (e.g., FIG. 1) where the crank rotational axis A1 horizontally extends and the housing 14 is mounted on the first base member B34. The first transmitting surface 26 is at least partly disposed below the crank rotational axis A1 in the bicycle upright state.

Figure 6:
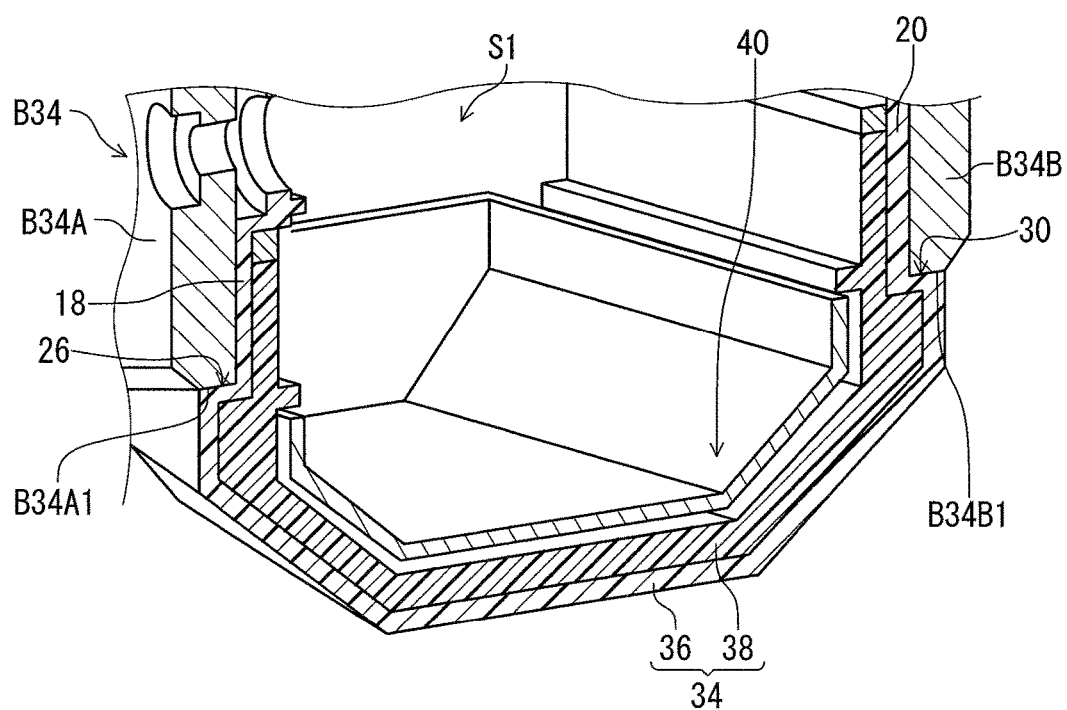
FIG. 6 is a cross-sectional view of the housing of the bicycle drive unit illustrated in FIG. 1.
Figure 7:
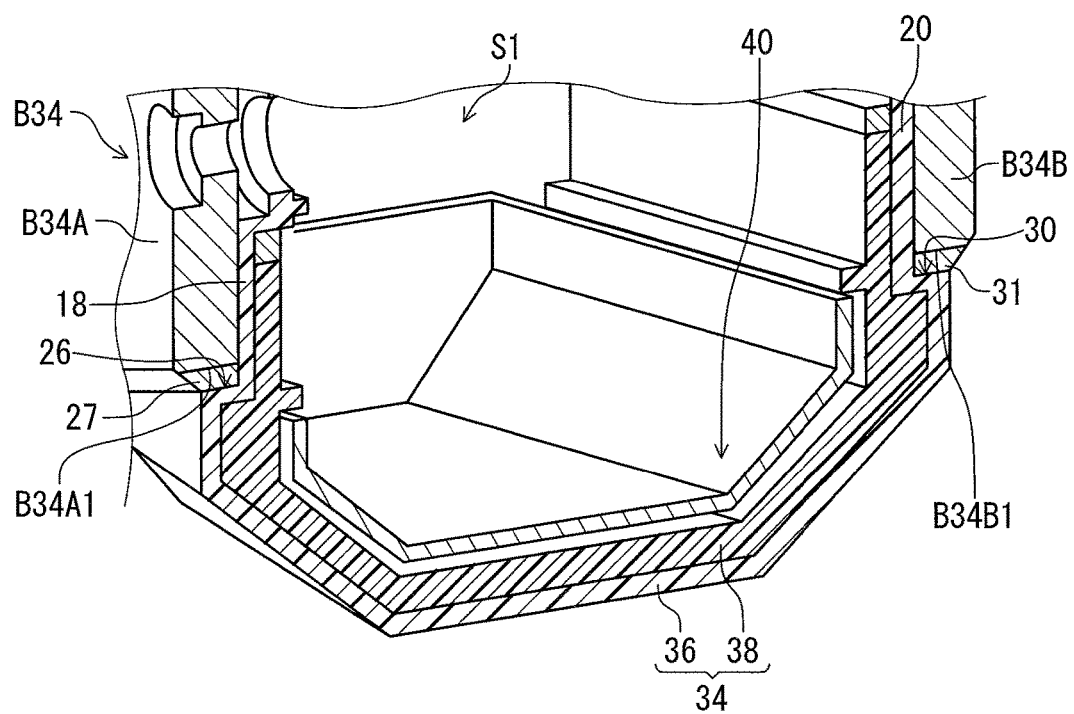
FIG. 7 is a cross-sectional view of a housing of a bicycle drive unit in accordance with a modification of the first embodiment.

As seen in FIG. 6, the first mounting part B34A includes a first receiving surface B34A1. The first transmitting surface 26 is configured to face the first receiving surface B34A1 of the first base member B34 to transmit an upward force from the housing 14 to the first base member B34. The first transmitting surface 26 is configured to contact the first receiving surface B34A1. Specifically, the first transmitting surface 26 is configured to directly contact the first receiving surface B34A1. However, as seen in FIG. 7, the bicycle drive unit 12 can comprise a first intermediate member 27 provided between the first receiving surface B34A1 and the first transmitting surface 26. In such an embodiment, the first transmitting surface 26 faces the first receiving surface B34A1 to transmit the upward force from the housing 14 to the first base member B34 via the first intermediate member 27 in the bicycle upright state. The first intermediate member 27 is made of resin such as synthetic rubber. The first intermediate member 27 is bonded or deposited on one of the first transmitting surface 26 and the first receiving surface B34A1.

As seen in FIGS. 4 and 5, the first wall 18 includes a first side surface 28 disposed to face the first base member B34 in the axial direction D1 parallel to the crank rotational axis A1. In this embodiment, as seen in FIG. 5, the first transmitting surface 26 is continuously coupled to the first side surface 28. However, the first transmitting surface 26 can be discontinuously provided relative to the first side surface 28. Furthermore, the first side surface 28 can be omitted from the housing 14.

As seen in FIG. 5, the first transmitting surface 26 includes a first linear surface 26A extending linearly in a perpendicular direction D2 perpendicular to the crank rotational axis A1. The first transmitting surface 26 includes a first curved surface 26B extending in a circumferential direction D3 defined about the crank rotational axis A1. The first curved surface 26B extends from an end of the first linear surface 26A in the circumferential direction D3.

The first transmitting surface 26 includes a first longitudinal end 26C, a first opposite longitudinal end 26D, and a first intermediate portion 26E. The first opposite longitudinal end 26D is opposite to the first longitudinal end 26C. The first intermediate portion 26E is provided between the first longitudinal end 26C and the first opposite longitudinal end 26D. The first intermediate portion 26E is disposed below the crank rotational axis A1 in the bicycle upright state. The first longitudinal end 26C is disposed above the crank rotational axis A1 in the bicycle upright state. The first longitudinal end 26C is closer to the crank rotational axis A1 than the first opposite longitudinal end 26D. The shape of the first transmitting surface 26 is not limited to this embodiment.

Figure 8:
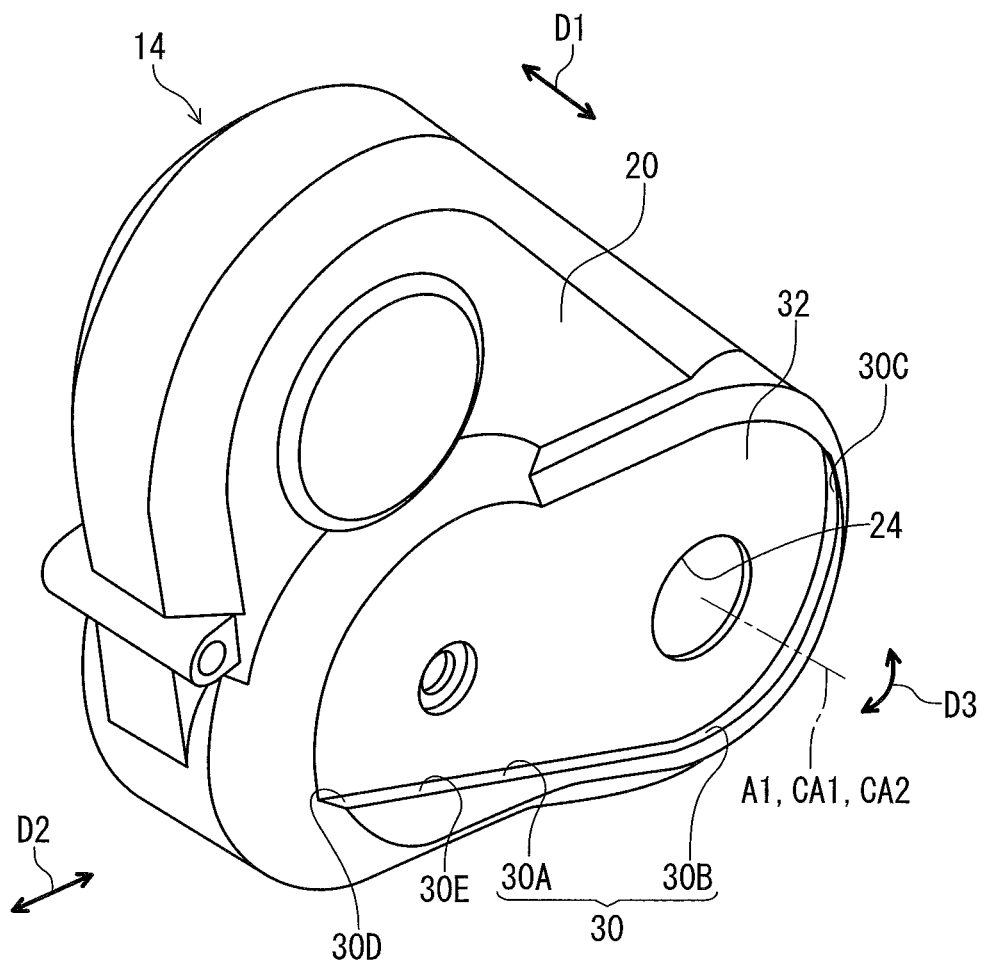
FIG. 8 is another perspective view of the housing of the bicycle drive unit illustrated in FIG. 1.

As seen in FIG. 8, the second wall 20 includes a second transmitting surface 30 disposed to at least partly face upward in the bicycle upright state (FIG. 1). The second transmitting surface 30 is at least partly disposed below the crank rotational axis A1 in the bicycle upright state.

As seen in FIG. 6, the second mounting part B34B includes a second receiving surface B34B1. The second mounting part B34B faces toward the first mounting part B34A in the axial direction D1. The second transmitting surface 30 is configured to face the second receiving surface B34B1 of the first base member B34 to transmit the upward force from the housing 14 to the first base member B34. The second transmitting surface 30 is configured to contact the second receiving surface B34B1. Specifically, the second transmitting surface 30 is configured to directly contact the second receiving surface B34B1. However, as seen in FIG. 7, the bicycle drive unit 12 can comprise a second intermediate member 31 provided between the second receiving surface B34B1 and the second transmitting surface 30. In such an embodiment, the second transmitting surface 30 faces the second receiving surface B34B1 to transmit the upward force from the housing 14 to the first base member B34 via the second intermediate member 31 in the bicycle upright state. The second intermediate member 31 is made of resin such as synthetic rubber. The second intermediate member 31 is bonded or deposited on one of the second transmitting surface 30 and the second receiving surface B34B1.

As seen in FIGS. 4 and 8, the second wall 20 includes a second side surface 32 disposed to face the first base member B34 in the axial direction D1 parallel to the crank rotational axis A1. The second side surface 32 faces in a reverse direction with respect to the axial direction D1 in comparison with the first side surface 28. In this embodiment, the second transmitting surface 30 is continuously coupled to the second side surface 32. However, the second transmitting surface 30 can be discontinuously provided relative to the second side surface 32. Furthermore, the second side surface 32 can be omitted from the housing 14.

The second transmitting surface 30 includes a second linear surface 30A extending linearly in the perpendicular direction D2. The second transmitting surface 30 includes a second curved surface 30B extending in the circumferential direction D3. The second curved surface 30B extends from an end of the second linear surface 30A in the circumferential direction D3.

The second transmitting surface 30 includes a second longitudinal end 30C, a second opposite longitudinal end 30D, and a second intermediate portion 30E. The second opposite longitudinal end 30D is opposite to the second longitudinal end 30C. The second intermediate portion 30E is provided between the second longitudinal end 30C and the second opposite longitudinal end 30D. The second intermediate portion 30E is disposed below the crank rotational axis A1 in the bicycle upright state. The second longitudinal end 30C is disposed above the crank rotational axis A1 in the bicycle upright state. The second longitudinal end 30C is closer to the crank rotational axis A1 than the second opposite longitudinal end 30D. The shape of the second transmitting surface 30 is not limited to this embodiment.

As seen in FIG. 6, the housing 14 includes a bottom part 34 coupled to the first wall 18 to at least partly define the internal space S1. The bottom part 34 is coupled to the second wall 20 to at least partly define the internal space S1. The bottom part 34 is disposed below the first transmitting surface 26 in the bicycle upright state. The bottom part 34 includes a bottom wall 36 and a reinforcing portion 38 coupled to the bottom wall 36 to reinforce the bottom wall 36. The reinforcing portion 38 is provided on the bottom wall 36 to partly define the internal space S1 and is attached to the bottom wall 36 with adhesive or other fastening structures. In this embodiment, the reinforcing portion 38 is a plate extending along an inner surface of the bottom wall 36. The reinforcing portion 38 has a thickness larger than a thickness of the bottom wall 36. However, the reinforcing portion 38 can have another shape. For example, the reinforcing portion 38 can include a rib having a honeycomb shape. Such a honeycomb rib extends from the bottom wall 36 toward the internal space S1. In this embodiment, the reinforcing portion 38 is a separate member from the bottom wall 36. However, the reinforcing portion 38 can be integrally provided with the bottom wall 36 as a one-piece unitary member. The reinforcing portion 38 can be omitted from the bottom part 34.

The bicycle drive unit 12 comprises an oil pan 40 to receive oil from an upper component such as a sprocket. The oil pan 40 is provided on the bottom part 34 in the internal space S1. The oil pan 40 can be omitted from the bicycle drive unit 12.

Figure 9:
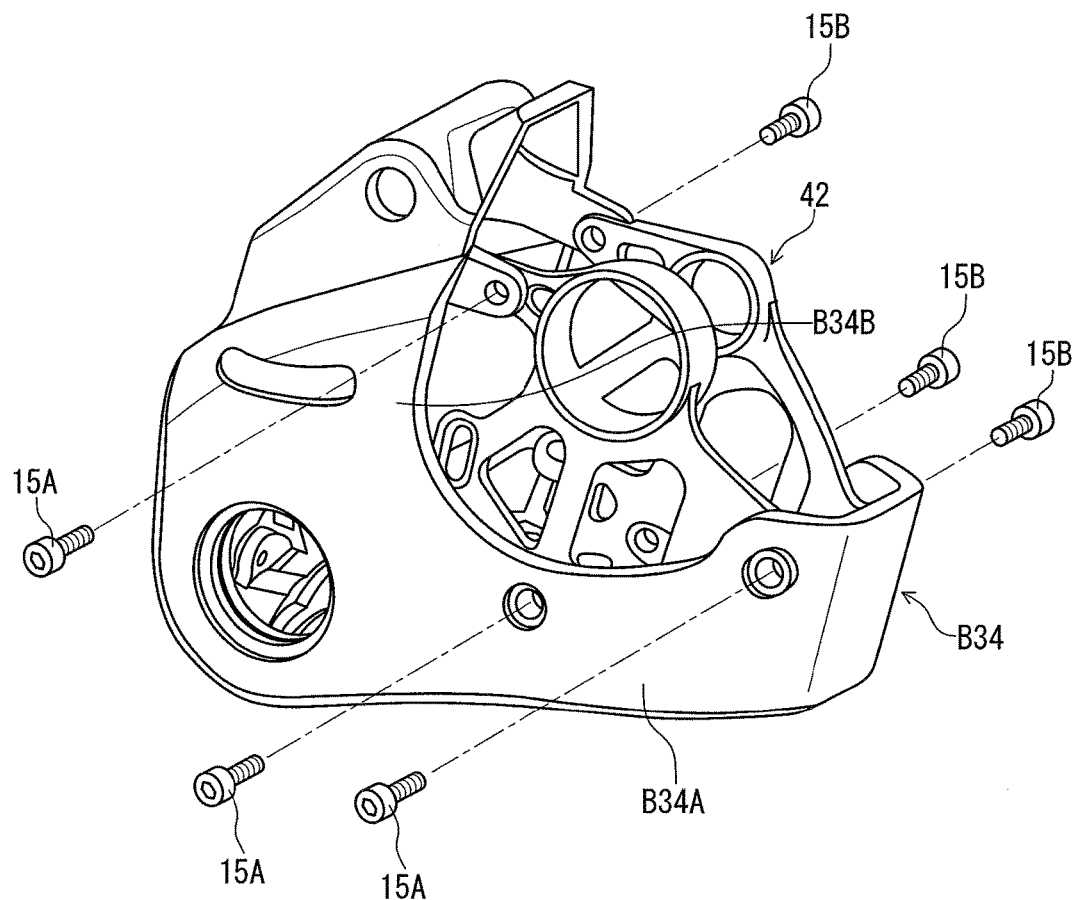
FIG. 9 is a perspective view of the first base member and an inner frame of the bicycle drive unit illustrated in FIG. 1, with the housing omitted.

As seen in FIG. 9, the bicycle drive unit 12 comprises an inner frame 42 provided in the housing 14. The inner frame 42 is disposed in the internal space S1. The inner frame 42 is secured to the first base member B34 with the fasteners 15A and 15B. The housing 14 and the inner frame 42 are secured to the first base member B34 with the fasteners 15A and 15B. Namely, the housing 14 and the inner frame 42 share the fasteners 15A and 15B. For example, the output member 16 (FIG. 2) and the shifting structure (e.g., a sprocket, an assist device, and other elements) is mounted to the inner frame 42. The inner frame 42 is made of a metallic material and reinforces the housing 14. However, the inner frame 42 can be omitted from the bicycle drive unit 12.

In this embodiment, one of the fasteners 15A and one of the fasteners 15B are disposed in an area defined by an outer diameter of the output member 16 (FIG. 2) when viewed from the axial direction D1. Specifically, one of the fasteners 15A and one of the fasteners 15B are disposed in an area of 70 mm radially defined from the output rotational axis A2, preferably in an area of 50 mm radially defined from the output rotational axis A2, and more preferably in an area of 30 mm radially defined from the output rotational axis A2. However, one of the fasteners 15A and one of the fasteners 15B can be disposed in an area of approximately 70 mm radially defined from the output rotational axis A2, preferably in an area of approximately 50 mm radially defined from the output rotational axis A2, and more preferably in an area of approximately 30 mm radially defined from the output rotational axis A2. Another of the fasteners 15A can be disposed in the above areas. Another of the fasteners 15B can be disposed in the above areas. One of the first transmitting surface 26 and the second transmitting surface 30 can be omitted from the bicycle drive unit 12. In this embodiment, the first transmitting surface 26 is provided on a right side of the bicycle drive unit 12, and the second transmitting surface 30 is provided on a left side of the bicycle drive unit 12. However, the first transmitting surface 26 can be provided on the left side of the bicycle drive unit 12, and the second transmitting surface 30 can be provided on the right side of the bicycle drive unit 12.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle drive unit comprising:
   a housing configured to be mounted to a first base member, the housing including a first wall at least partly defining an internal space to at least partly accommodate a bicycle crank having a crank rotational axis, the first wall including a first opening aligned with the crank rotational axis, the first wall including a first transmitting surface disposed to at least partly face upward in a bicycle upright state where the crank rotational axis horizontally extends and the housing is mounted on the first base member, the first transmitting surface being configured to face a first receiving surface of the first base member to transmit an upward force from the housing to the first base member, the first transmitting surface being at least partly disposed below the crank rotational axis in the bicycle upright state, wherein the first transmitting surface includes an upward-facing portion disposed below the crank rotational axis in the bicycle upright state that is configured to contact the first receiving surface of the first base member to transmit the upward force.

2. The bicycle drive unit according to claim 1, further comprising a first intermediate member provided between the first receiving surface and the first transmitting surface such that the first transmitting surface indirectly contacts the first receiving surface via the first intermediate member, wherein the first transmitting surface faces the first receiving surface to transmit the upward force from the housing to the first base member via the first intermediate member in the bicycle upright state.

3. The bicycle drive unit according to claim 1, wherein the housing is made of a resin material.

4. The bicycle drive unit according to claim 1, wherein the first wall includes a first side surface disposed to face the first base member in an axial direction parallel to the crank rotational axis.

5. The bicycle drive unit according to claim 4, wherein the first transmitting surface is continuously coupled to the first side surface.

6. The bicycle drive unit according to claim 1, wherein the first wall is configured to be secured to the first base member with a fastener.

7. The bicycle drive unit according to claim 1, wherein the first opening includes a first center axis coinciding with the crank rotational axis.

8. The bicycle drive unit according to claim 1, wherein the upward-facing portion of the first transmitting surface includes a first linear surface extending linearly in a perpendicular direction perpendicular to the crank rotational axis.

9. The bicycle drive unit according to claim 1, wherein the first transmitting surface includes a first curved surface extending in a circumferential direction defined about the crank rotational axis.

10. The bicycle drive unit according to claim 9, wherein the upward-facing portion of the first transmitting surface includes a first linear surface extending linearly in a perpendicular direction perpendicular to the crank rotational axis, and the first curved surface extends from an end of the first linear surface in the circumferential direction.

11. The bicycle drive unit according to claim 1, wherein the first transmitting surface includes a first longitudinal end, a first opposite longitudinal end opposite to the first longitudinal end, and a first intermediate portion included in the upward-facing portion and provided between the first longitudinal end and the first opposite longitudinal end, and the first intermediate portion is disposed below the crank rotational axis in the bicycle upright state.

12. The bicycle drive unit according to claim 11, wherein the first longitudinal end is closer to the crank rotational axis than the first opposite longitudinal end.

13. The bicycle drive unit according to claim 1, wherein the housing includes a second wall spaced apart from the first wall in an axial direction parallel to the crank rotational axis to at least partly define the internal space between the first wall and the second wall.

14. The bicycle drive unit according to claim 13, wherein the second wall includes a second transmitting surface disposed to at least partly face upward in the bicycle upright state and configured to face a second receiving surface of the first base member to transmit the upward force from the housing to the first base member, and the second transmitting surface is at least partly disposed below the crank rotational axis in the bicycle upright state.

15. The bicycle drive unit according to claim 14, wherein the first base member includes a first mounting part and a second mounting part spaced apart from the first mounting part in the axial direction, and the housing is provided between the first mounting part and the second mounting part in the axial direction.

16. The bicycle drive unit according to claim 15, wherein the first mounting part includes the first receiving surface, and the second mounting part includes the second receiving surface.

17. The bicycle drive unit according to claim 1, wherein the housing includes a bottom part coupled to the first wall to at least partly define the internal space, and the bottom part is disposed below the first transmitting surface in the bicycle upright state.

18. The bicycle drive unit according to claim 17, wherein the bottom part includes a bottom wall, and a reinforcing portion coupled to the bottom wall to reinforce the bottom wall.

19. The bicycle drive unit according to claim 1, further comprising:

a second opening aligned with the crank rotational axis.

20. The bicycle drive unit according to claim 1, wherein the first transmitting surface intersects with the first wall to form an edge from which the upward-facing portion protrudes, the edge having a portion disposed below the crank rotational axis and below the first opening in the bicycle upright state.

21. The bicycle drive unit according to claim 1, wherein the first transmitting surface includes a first curved surface that is curved with respect to a circumferential direction disposed around the crank rotational axis.

22. The bicycle drive unit according to claim 1, wherein the upward-facing portion of the first transmitting surface is disposed so as to overlap the internal space in an axial direction parallel to the crank rotational axis.

23. A bicycle drive unit comprising:

a housing configured to be mounted to a first base member, the housing including a first wall at least partly defining an internal space to at least partly accommodate a bicycle crank having a crank rotational axis, the first wall including a first transmitting surface disposed to at least partly face upward in a bicycle upright state where the crank rotational axis horizontally extends and the housing is mounted on the first base member, the first transmitting surface being configured to face a first receiving surface of the first base member to transmit an upward force from the housing to the first base member, the first transmitting surface being at least partly disposed below the crank rotational axis in the bicycle upright state, wherein the first transmitting surface includes
- a first longitudinal end,
- a first opposite longitudinal end opposite to the first longitudinal end, and
- a first intermediate portion provided between the first longitudinal end and the first opposite longitudinal end, the first intermediate portion is disposed below the crank rotational axis in the bicycle upright state, the first longitudinal end is disposed above the crank rotational axis in the bicycle upright state, and the first transmitting surface includes an upward-facing portion disposed below the crank rotational axis in the bicycle upright state that is configured to contact the first receiving surface of the first base member to transmit the upward force, the upward-facing portion including the first intermediate portion.

24. The bicycle drive unit according to claim 23, wherein the upward-facing portion of the first transmitting surface is disposed so as to overlap the internal space in an axial direction parallel to the crank rotational axis.

* * * * *